Patented Dec. 20, 1932

1,891,440

UNITED STATES PATENT OFFICE

HAROLD OMAR NOLAN, OF NEW YORK, N. Y., ASSIGNOR OF ONE-HALF TO CARLETON ELLIS, OF MONTCLAIR, NEW JERSEY

TAWING, DEHYDRATING, AND ASTRINGENT PRODUCT

Tawing.  Application filed February 24, 1926. Serial No. 90,427.

This invention relates to products for application to the surface of animal tissues to procure tawing, antiseptic, astringent, anhidrotic, or coagulant effects.

These new products consist of solutions of suitable organic or mixtures of organic and inorganic salts of metals, such as zinc and aluminum, whose soluble salts are astringent, in suitable organic liquids, mixed with water. The salts are chosen so as to remain in solution in the mixture of organic liquid and water in the conditions of use. Such salts are, for example, aluminum acetate, aluminum chloride, zinc acetate, zinc paraphenolsulphonate. When mixtures of salts are used the latter must be so chosen that no precipitation by double decomposition can occur.

The organic liquid must be miscible with water, volatile at ordinary temperatures, penetrant to animal tissues and solvent of the salt or salts used, or, at least, not capable of throwing these out of their aqueous solution, to a substantial degree, in the conditions of use. These conditions are fulfilled by acetone, methanol, ethanol, propanol and isopropanol, in their various commercial forms, as well as by mixtures of these. In any given case the choice of organic liquid must depend on the special conditions, notably on the nature of the salt in use, on the degree of dilution contemplated and on the temperature.

The following is an example of one composition of the kind described:— (parts by weight)

|  | Parts |
|---|---|
| Aluminum acetate | 6 |
| Water | 50 |

To this solution add: isopropanol, to make 100 parts.

The following is another example:—

|  | Parts |
|---|---|
| 1. Aluminum acetate | 6 |
| Water | 25 |
| 2. Aluminum chloride | 10 |
| Water | 30 |
| 3. Ethanol | 30 |

Add the ethanol to the aluminum chloride solution and at or mix in the aluminum acetate solution.

The advantages claimed for these compositions are several. In the first place, the surfaces of animal tissues are usually somewhat repellent to plain aqueous solutions of these salts and are not readily evenly wetted nor well penetrated by them. The organic fluids cause the surface of the tissues to be evenly wetted by the solutions and by their strong penetrating power carry the salts below the surface. In the second place, these organic liquids being themselves dehydrants, coagulants and antiseptics, act as powerful adjuvants to the astringent metallic salts with which they are associated. In the third place, by their ready volatility they facitate drying of the surface, which with their dehydrating property, eliminates certain desirable functions of simple aqueous solutions. In the fourth place, the alcohols tend to depress the formation in such solutions of free acid resulting from hydrolytic dissociation of the metallic salt. In the case of the mixture of organic and inorganic salt (such as the mixture containing the chloride and the acetate) there is the further advantage that any such free acid will be relatively weak organic acid while the high solubility of the inorganic constituent permits of the utilization of strong solutions. Experiment has shown that such solutions are stable, and that, even on heating, little if any free acid is given off. This may be due to esterification. This point is of especial importance where the use of the solutions brings them in contact with human skin.

The proportion of metallic salt should be between 5 per cent and 25 per cent by weight, depending on the salts used and on the purpose for which the solution is to be employed. The organic liquid penetrant may constitute from not less than 15 to not more than 50 per cent by weight. In the case of the more volatile organic penetrants, it has been found advantageous to use the higher percentages, to counterbalance the rapid loss by evaporation.

While I have spoken especially of the acetate and chloride of aluminum, I do not preclude myself from the use of other salts and mixtures, each in its suitable applications. For example my invention covers solutions made with the other halides of aluminum, as well as the lactate, the citrate, the tartrate of the same metal, the salts of the lower fatty acids with aluminum and zinc, the nitrates of aluminum and zinc and the salicylate of zinc.

It is an important characteristic of these stable compositions that, when applied to animal membranes, they do not segregate in irregular "oily" patches but wet the surface uniformly.

What I claim is:—

1. A stable composition comprising an aluminum salt dissolved in a liquid containing volatile alcoholic material, the concentration of the salt being between 5 and 25% by weight of the composition; said composition yielding a continuous film without segregating into irregular "oily" patches on application to animal membrane.

2. A liquid composition comprising aluminum acetate, water and alcohol.

3. A liquid composition comprising aluminum acetate, aluminum chloride, water and alcohol.

4. A composition comprising an aqueous solution of aluminum chloride stabilized by aluminum acetate and ethyl alcohol.

5. A composition comprising an aqueous alcoholic solution of aluminum chloride and an organic salt of aluminum.

6. A liquid composition comprising an aluminum compound having an astringent action on animal tissues, dissolved in water and a water miscible liquid organic solvent volatile at ordinary temperatures and possessing the power of penetrating animal tissues.

7. A stable composition comprising an aluminum salt dissolved in a liquid containing water and a volatile alcoholic material, the concentration of the salt being between 5 and 25% by weight of the composition; said composition yielding a continuous film without segregation into irregular oily patches on application to animal membrane.

8. A stable composition comprising a water-soluble aluminum salt and dissolved in liquid volatile material selected from the group including acetone and an aliphatic alcohol containing not more than 4 carbon atoms.

9. A liquid composition comprising an aluminum compound having an astringent action on animal tissues, dissolved in water and a water miscible liquid organic solvent volatile at ordinary temperatures and possessing the power of penetrating animal tissues, said organic solvent being selected from the group including acetone and an aliphatic alcohol containing not more than 4 carbon atoms.

HAROLD OMAR NOLAN.

CERTIFICATE OF CORRECTION.

Patent No. 1,891,440. December 20, 1932.

HAROLD OMAR NOLAN.

It is hereby certified that error appears in the printed specification of the above numbered patent requiring correction as follows: Page 1, line 67, after "curtain" insert "less"; and that the said Letters Patent should be read with this correction therein that the same may conform to the record of the case in the Patent Office.

Signed and sealed this 24th day of October, A. D. 1933.

(Seal)

F. M. Hopkins
Acting Commissioner of Patents.